United States Patent [19]
Feldman

[11] Patent Number: 5,859,708
[45] Date of Patent: Jan. 12, 1999

[54] SENSING BLEND COLOR HOMOGENEITY

[75] Inventor: Sandra Freedman Feldman, Schenectady, N.Y.

[73] Assignee: General Electric Company, Schenectady, N.Y.

[21] Appl. No.: 926,084

[22] Filed: Sep. 2, 1997

[51] Int. Cl.⁶ ..................................................... G01J 3/50
[52] U.S. Cl. ........................ 356/406; 356/407; 356/425
[58] Field of Search ............................. 356/38, 402, 405, 356/406, 407, 409, 410, 425

[56] References Cited

U.S. PATENT DOCUMENTS

| | | | |
|---|---|---|---|
| 5,559,173 | 9/1996 | Campo et al. | 356/425 |
| 5,590,251 | 12/1996 | Takagi | 395/131 |
| 5,642,192 | 6/1997 | Gordon et al. | 356/328 |
| 5,650,942 | 7/1997 | Granger | 364/526 |

Primary Examiner—F. L. Evans
Attorney, Agent, or Firm—Patrick K. Patnode; Marvin Snyder

[57] ABSTRACT

An apparatus for sensing color blend homogeneity in a mixture having a first and second blend portion includes a light transmissive plate for holding the mixture, a light source for emitting a light beam, and a color sensor optically coupled to the light source. An illumination assembly has a first end optically coupled to the light source and a second end optically coupled to and disposed normal to the light transmissive plate so as to illuminate the mixture disposed on the plate with the light beam. At least one detection assembly is provided, having a first end disposed adjacent the light transmissive plate so as to detect the diffuse reflection from the illuminated mixture. Next, the color sensor collects the diffuse reflecting light from the first and second material blends and transforms the diffuse reflecting light into tri-color signals so as to determine the local and global homogeneity of the first and second material blend portions.

44 Claims, 3 Drawing Sheets

5,859,708

SENSING BLEND COLOR HOMOGENEITY

BACKGROUND OF THE INVENTION

This application relates generally to color blend mixing, and in particular relates to sensing blend color homogeneity.

Modern plastic materials have found a wide range of markets and a variety of applications in diverse manufacturing fields. These plastic materials offer many desirable characteristics such as an excellent finish, desirable electrical, thermal and mechanical properties, low-cost and a variety of colors.

Plastics are typically formed of one or more base polymers or resins, one or more colorants, and other additives. Such additives may include, for example, fiberglass for structural reinforcement, flame retardants, plasticizers, or mold release agents. The plastics are manufactured by initially mixing these components to form a substantially homogeneous polymer blend. The polymer blend then typically undergoes extrusion, or the like, to form a raw product, for example pellets. The raw products are then utilized to produce final polymer products of various forms.

Recently, in the field of polymer design, there has been a demand for color polymer blend techniques that make it possible to faithfully reproduce blend colors. The color of the final product may depend on several factors including the concentration and type of colorant and base resin, temperature history during mixing, and the ultimate degree of constituent inter-mixing achieved during processing. Thus, variations in color between polymer products may arise for a variety of reasons.

For example, color may vary among products due to polymer product formulation or recipe differences. Color variations may exist between lots for a given product formulation or recipe due to machine-to-machine differences. Color differences may exist within lots due to changing raw material characteristics, changing operating conditions, and inaccuracies and other anomalies in processing, including speed rates.

Polymer color is typically manually adjusted by adjusting the amount of colorant for a given production run. The colorant may take any conventional form which affects the color of the polymer product by itself or in combination with other constituents. For example, solid pigments and liquid pigments or dyes may be used for affecting the color of the final product.

In a typical production process, the colorant and base resin are blended together and compounded or extruded in a laboratory machine to generate pellets. The pellets are then injection molded to obtain a plaque with substantially uniform color, which is then conventionally measured in a laboratory spectrocolorimeter. The measured plaque color is compared with a reference or standard plaque color, and differences therebetween are corrected by adjusting the colorant. The sequence is repeated until the plaque color falls within an acceptable range to the reference plaque.

A sample of the finally corrected colorant and resin blend is then compounded on a production scale machine that follows the same procedure as the laboratory machine to produce a color plaque which is again compared with a reference plaque. If required, the color in the production machine is suitably corrected to affect an acceptable match between the measured plaque and the reference plaque.

This process, therefore, requires many steps to achieve a desired color in the polymer pellets which increases processing time and cost. Accordingly, it is desired to improve the process of constituent inter-mixing in the production of a polymer product from base resins and colorants.

SUMMARY OF THE INVENTION

An apparatus for sensing color blend homogeneity in a mixture having a first and second blend portion includes a light transmissive plate for holding the mixture, a light source for emitting a light beam, and a color sensor optically coupled to the light source. An illumination assembly has a first end optically coupled to the light source and a second end optically coupled to and disposed normal to the light transmissive plate so as to illuminate the mixture disposed on the plate with the light beam. At least one detection assembly is provided, having a first end disposed adjacent the light transmissive plate so as to detect the diffuse reflection from the illuminated mixture. Next, the color sensor collects the diffuse reflecting light from the first and second material blend portions and transforms the diffuse reflecting light into tri-color signals so as to determine the local and global homogeneity of the first and second material blend portions.

DETAILED DESCRIPTION OF THE INVENTION

Figure 1:
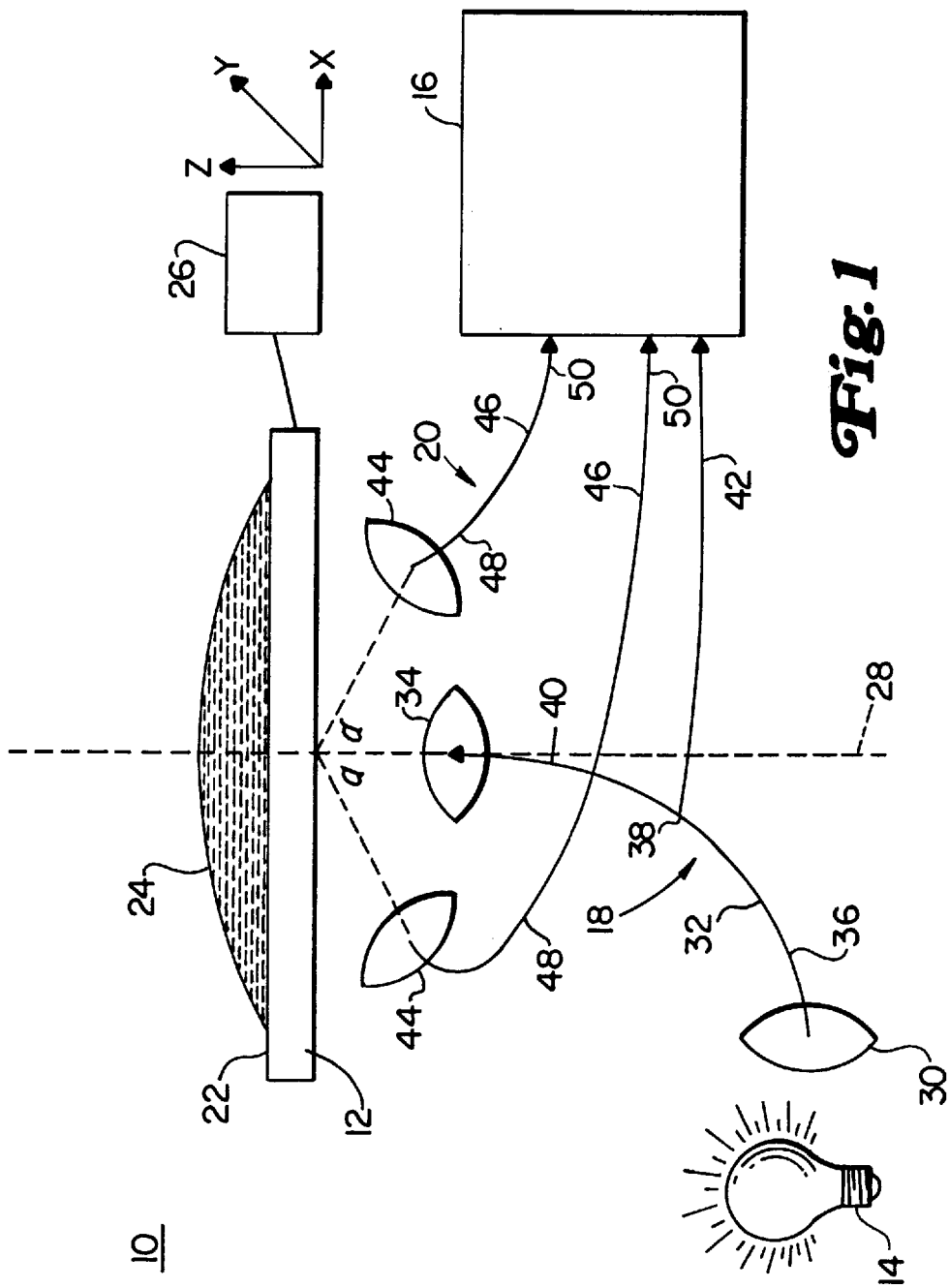
FIG. 1 is a schematic illustration of one embodiment of the instant invention.

An apparatus for sensing color blend homogeneity 10 comprises a light transmissive plate 12, a light source 14, a color sensor 16, an illumination assembly 18, and at least one detection assembly 20, as shown in FIG. 1.

Light transmissive plate 12 includes a top surface 22 for deposition of respective test samples of a material blend 24. Light transmissive plate 12 should be optically transparent. In one embodiment, light transmissive plate 12 comprises a quartz material or the like. Although the present invention is described herein in connection with light transmissive plate 12, the present invention is not limited to practice with light transmissive plate 12. The present invention can be implemented and utilized with many other configurations. For example, light transmissive plate 12 may be housed within the bottom surface of a storage bin or the like.

In one embodiment, light transmissive plate 12 further comprises a multi-axis positioner 26. Multi-axis positioner 26 enables manipulation of light transmissive plate 12 in three degrees of freedom; z-adjustment to manipulate the height of plate 12 translated along reference axis 28, and y-adjustment and x-adjustment to permit sensing over various regions of a respective sample of blend 24. Multi-axis positioner 26 may further comprise a tilt control to level blend 24 by adjusting the pitch and yaw of plate 12.

Light source 14 is provided for emitting and projecting a light beam to blend 24. Light source 14 may include any light source capable of providing a spectrum through the visible light region, typically avoiding fluorescence. In one embodiment, light source 14 emits a light beam at a wavelength in the range between about 400 nm to about 770 nm. In one embodiment, light source 14 comprises a tungsten-halogen light source.

In one embodiment of the instant invention, color sensor 16 is optically coupled, as described below, to light source 14. Color sensor 16 may comprise a spectrometer, a spectrophotometer, a spectrocolorimeter, a spectrophotometric calorimeter, or the like, to perform spectrum color analysis of any incident light supplied thereto.

Illumination assembly 18 comprises a first lens 30, at least a bifurcated optical fiber 32 and a second lens 34. First lens 30 is disposed to receive light emitted from light source 14. First lens 30 typically comprises a planoconvex lens or the like. A light source end 36 of bifurcated optical fiber 32 is aligned with first lens 30 so as to provide an optical coupling at light source 14. The light beam is emitted from light source 14, is focused by first lens 30 and is injected into light source end 36 of optical fiber 32. At a bifurcation point 38, optical fiber 32 splits into a plate portion 40 and a color sensor portion 42.

Plate portion 40 of optical fiber 32 is disposed normal to and proximate light transmissive plate 12. Second lens 34 is positioned adjacent light transmissive plate 12. The light beam injected into optical fiber 32 passes through plate portion 40 is intercepted by second lens 34 and is projected onto light transmissive plate 12 so as to illuminate sample blend 24.

Color sensor portion 42 of optical fiber is optically coupled to color sensor 16 so as to provide a reference of the signal representing the light beam emitted from light source 14.

Detection assembly 20 comprises a first detection lens 44 and an optical fiber 46. First detection lens 44 is disposed adjacent to light transmissive plate at an angle ($\alpha$) with respect to reference axis 28 so as to detect diffuse reflection from the illuminated sample of blend 24. Reference axis 28 is aligned essentially perpendicular to light transmissive plate 12.

In one embodiment of the instant invention, angle ($\alpha$) is in the range between about 1° to about 89°. In another embodiment of the instant invention, angle ($\alpha$) is in the range between about 35° to about 55°. A first end 48 of optical fiber 46 is optically coupled to first detection lens 44 such that diffuse reflection directed into first detection lens 44 is injected into first end 48 of optical fiber 46 and is transmitted through optical fiber 46 to a second end 50 of optical fiber 46, which second end 50 is optically coupled to color sensor 16.

Although the present invention is described as including a single detection assembly 20, the present invention is not limited to practice with a single detection assembly 20. The present invention can be implemented and utilized with many other configurations. For example, two or more detection assemblies 20 may be utilized within the present invention, as shown in FIG. 1.

Color sensor 16 senses the light transmitted through optical fiber 46. The collected light from sample blend 24 is transformed by color sensor 16 into signals providing color information, typically values designated by L, a and b or other tri-color signals, for example, RGB, X, Y, Z or the like (hereinafter referred to as "tri-color signal"). For purposes of discussion, tri-color signals will be discussed in terms of L, a, b coordinate system wherein the lightness is typically called L, the red-green coordinate is called a, (positive for red colors and negative for green colors) and the yellow-blue coordinate is called b, (positive for yellow colors and negative for blue colors). This L, a, b coordinate system is a color measuring system that is currently utilized and known in the art. The utilization of the L, a, b coordinate system within this application is for purposes of discussion only and is not a limitation of the instant invention. In fact, the instant invention can be utilized with any known color measurement system.

The tri-color signal generated by color sensor 16 provides color information about the collected light by measuring the diffusely reflected spectrum from blend sample 24 and transforming the measured spectrum into standard color units such as L, a and b, or the like.

In accordance with one embodiment of the instant invention, blend sample 24 and at least a second blend sample (not shown) are removed from at least two locations within a polymer mixing vessel, for example, a blender. First sample 24 is placed on light transmissive plate 12, as shown in FIG. 1. Light source 14 emits a light beam to blend sample 24 through illumination assembly 18 and the diffuse reflection of sample 24 is detected by detection assembly 20 and is transmitted to color sensor 16. Color sensor 16 collects the light from sample blend 24 and transforms the collected light into a first tri-color signal.

Next, in accordance with one embodiment of the instant invention, the light transmissive plate is moved with respect to illumination assembly 10, typically by multi-axis positioner 26, such that a different portion of blend sample 24 is illuminated and hence, a second diffuse reflection of blend sample 24 is detected by detection assembly 20 and is transmitted to color sensor 16.

Accordingly, color sensor 16 senses the light from blend sample 24 and transforms the collected light into a second tri-color signal.

This process of manipulating the light transmissive plate and transforming the collected light into a tricolored signal is performed at a number of locations of blend sample 24, typically in the range between about 8 to 30 locations.

Upon completion of the color sensing of blend sample 24, the average tri-color signal from all locations is calculated and the standard deviation of the various tri-color signals is calculated. Accordingly, sample blend 24 is uniquely characterized by six values: $L_{av}$; $a_{av}$; $b_{av}$; $L_{st}$; $a_{st}$ and $b_{st}$. $L_{av}$ is the average lightness coordinate, $a_{av}$ is the average red-green coordinate, bav is the average yellow-blue coordinate, $L_{st}$ is the standard deviation of the lightness coordinates, $a_{st}$ is the standard deviation of the red-green coordinates, and $b_{st}$ is the standard deviation of the yellow-blue coordinates.

Next, sample blend 24 is replaced by at least a second blend sample and the above described process is completed for the second blend sample such that the second blend sample is also uniquely characterized by six values: $L'_{av}$; $a'_{av}$; $b'_{av}$; $L'_{st}$; $a'_{st}$; and $b'_{st}$.

Next, in one embodiment of the instant invention, the average color difference ($\Delta E_{av}$) between the respective samples is calculated utilizing the following formula:

$$\Delta E_{av} = \sqrt{(\Delta L_{av}^2 + \Delta a_{av}^2 + \Delta b_{av}^2)} \quad ,$$

where, $\Delta L_{av} = L_{av} - L'_{av}$, $\Delta a_{av} = a_{av} - a'_{av}$, and $\Delta b_{av} = b_{av} - b'_{av}$.

If the value of ($\Delta E_{av}$) is less than or equal to about 1, the blend is characterized as being globally homogeneous. If the value of ($\Delta Eav$) is greater than about 1, for example about two or about 3, the blend is not globally homogeneous Next, the standard deviations of the respective samples are compared. If the standard deviation values ($L_{st}$; $a_{st}$; $b_{st}$; $L'_{st}$; $a'_{st}$; and $b'_{st}$.) are less than a predetermined amount, the blend is characterized as being locally homogeneous. The predetermined amount is satisfied if the standard deviation values are less than about 0.25 to about 2 L, a, b units.

The blend is sufficiently mixed when the values indicate the samples are both globally and locally homogeneous. If the values indicate that the samples are not both globally and locally homogeneous, the blending process continues as the constituents are not fully inter-mixed.

This entire process of determining blend homogeneity can be carried out with a controller electrically coupled to color sensor 16. The controller comprises circuitry, such as a microprocessor chip or the like.

Figure 2:
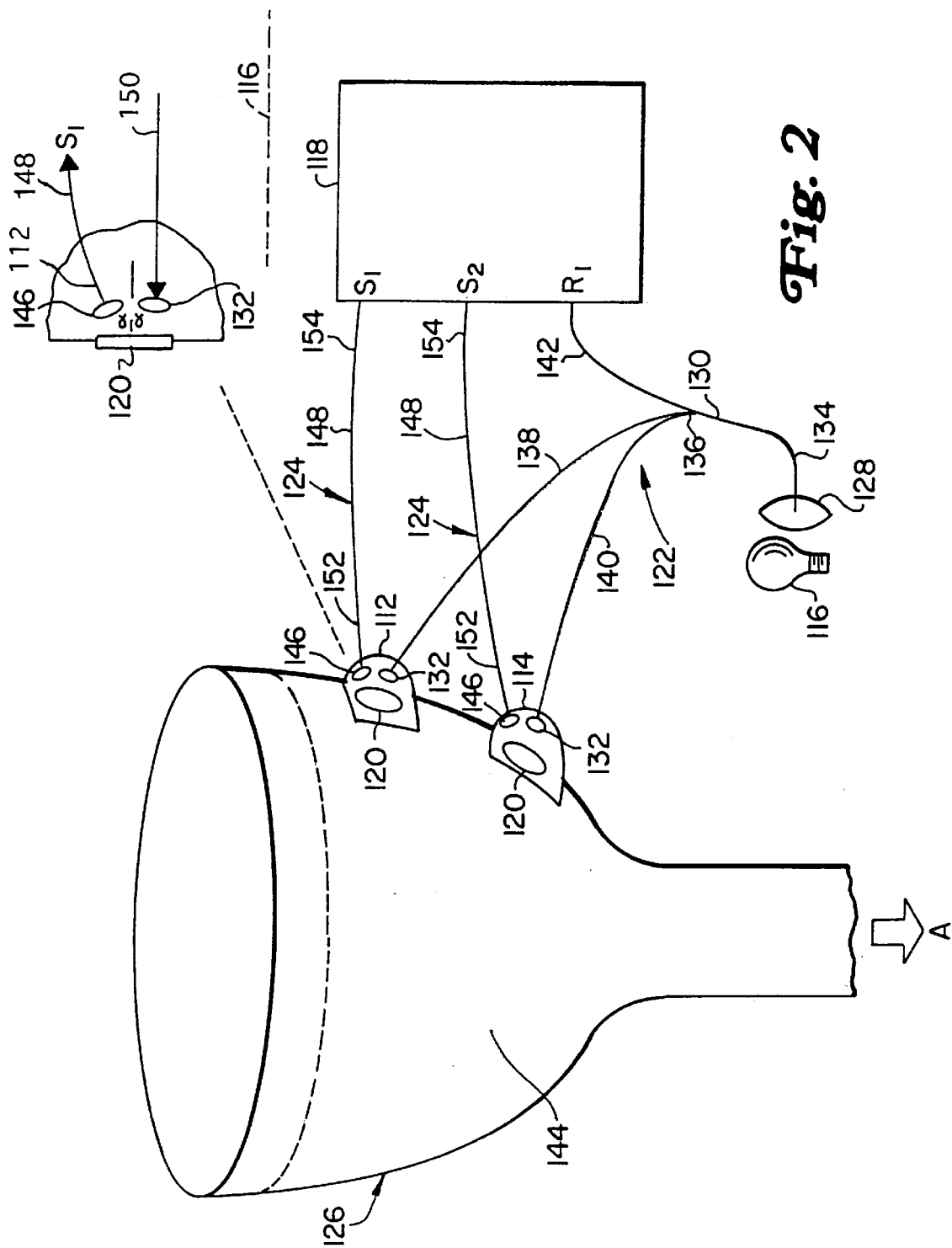
FIG. 2 is a schematic illustration of another embodiment of the instant invention.

In accordance with another embodiment of the instant invention, an on-line apparatus for sensing color blend homogeneity 110 comprises at least a first probe assembly 112, a second probe assembly 114, a light source 116 and a color sensor 118, as shown in FIG. 2.

First probe assembly 112 and second probe assembly 114 each comprise a light transmissive window 120, a portion of an illumination assembly 122, and a detection assembly 124. Light transmissive window 120 is disposed within a sidewall of a mixing vessel 126, typically a blender or the like. Light transmissive window 120 must be optically transparent. In one embodiment, light transmissive window 120 comprises a quartz material or the like.

Light source 116 is provided for emitting and projecting a light beam to mixing vessel 126. Light source 116 may include any light source capable of providing a spectrum through the visible light region, typically avoiding fluorescence.

In one embodiment, color sensor 118 is optically coupled, as described below, to light source 116. Color sensor 118 may comprise a spectrometer, a spectrophotometer, a spectrocolorimeter, a spectrophotometric colorimeter, or the like, to perform spectrum color analysis of any incident light supplied thereto.

Illumination assembly 122 comprises a first lens 128, at least a trifurcated optical fiber 130 and at least a pair of second lenses 132. First lens 128 is disposed to receive light emitted from light source 116. First lens 128 typically comprises a planoconvex lens or the like. A light source end 134 of trifurcated optical fiber 130 is aligned with first lens 128 so as to provide an optical coupling at light source 116. A light beam emitted from light source 116 is focused by first lens 128 and is injected into light source end 134 of optical fiber 130. At a trifurcation point 136 optical fiber 130 splits into a first probe portion 138, a second probe portion 140 and a color sensor portion 142.

First probe portion 138 and second probe portion 140 of optical fiber 130 are disposed normal to and proximate to light transmissive windows 120 of first probe assembly 112 and second probe assembly 114, respectively. Second lens 132 is positioned adjacent light transmissive window 120 of each probe assembly 112 and 114. The light beam injected into optical fiber 130 travels through first and second probe portions 138 and 140 is intercepted by respective second lenses 132 and is projected onto respective light transmissive windows 120 so as to illuminate portions of a sample blend 144 within blender 126.

Detection assembly 124 comprises a lens 146 and an optical fiber 148. Lenses 146 are positioned adjacent light transmissive window 120 of each respective probe assembly 112 and 114 at an angle (α) with respect to a reference axis 150 so as to detect diffuse reflection from an illuminated sample blend 144 within blender 126. Reference axis 150 is aligned essentially perpendicular to light transmissive window 120.

In one embodiment of the instant invention the angle (α) is in the range between about 1° to about 89°. In another embodiment of the instant invention, angle (α) is in the range between about 35° to about 55°. A first end 152 of optical fiber 148 is optically coupled to lens 146 such that diffuse reflection directed into lens 146 is injected into first end 152 of optical fiber 148 and is transmitted through optical fiber 148 to a second end 154 of optical fiber 148, which second end 154 is optically coupled to color sensor 118.

During blending, color sensor 118 collects the light from the sample blend 144 from both the first probe assembly 112 and second probe assembly 114. The collected light is transformed by color sensor 118 into tri-color signals. The light is collected and transformed by color sensor into tri-color signals a number of times, typically in the range between about 8 to 30 times.

Upon completion of the color sensing of sample blend 144, the average tri-color signal from each probe assembly location is calculated and the standard deviation of the various tri-color signals is calculated with respect to each location. Accordingly, sample blend 144 is uniquely characterized by six values at first probe assembly 112: $L_{av}$; $a_{av}$; $b_{av}$; $L_{st}$; $a_{st}$ and $b_{st}$ and six values at second probe assembly 114: $L'_{av}$; $a'_{av}$; $b'_{av}$; $L'_{st}$; $a'_{st}$ and $b'_{st}$.

Next, in one embodiment of the instant invention, the average color difference (ΔEav) between the respective samples is calculated utilizing the following formula:

$$\Delta E_{av} = \sqrt{(\Delta L_{av}^2 + \Delta a_{av}^2 + \Delta b_{av}^2)} \quad ,$$

where, $\Delta L_{av}=L_{av}-L'_{av}$, $\Delta a_{av}=a_{av}-a'_{av}$, and $\Delta b_{av}=b_{av}-b'_{av}$.

If the value of $(\Delta E_{av})$ is less than or equal to about 1, the blend is characterized as being globally homogeneous. If the value of $(\Delta E_{av})$ is greater than about 1, for example about two or about 3, the blend is not globally homogeneous Next, the standard deviation tri-color signal values at the respective probe locations are compared. If the standard deviation values ($L_{st}$; $a_{st}$; $b_{st}$; $L'_{st}$; $a'_{st}$; and $b'_{st}$) are less than a predetermined amount, the blend is characterized as being locally homogeneous. The predetermined amount is satisfied if the standard deviation values are less than about 0.25 to about 2 L, a, b units.

The blend is sufficiently mixed when the values indicate the samples are both globally and locally homogeneous. If the values indicate that the samples are not both globally and locally homogeneous, the blending process continues as the constituents are not fully inter-mixed.

This online blend monitoring process of determining blend homogeneity can be carried out with a controller electrically coupled to color sensor 118. The controller comprises circuitry, such as a microprocessor chip or the like.

Figure 3:
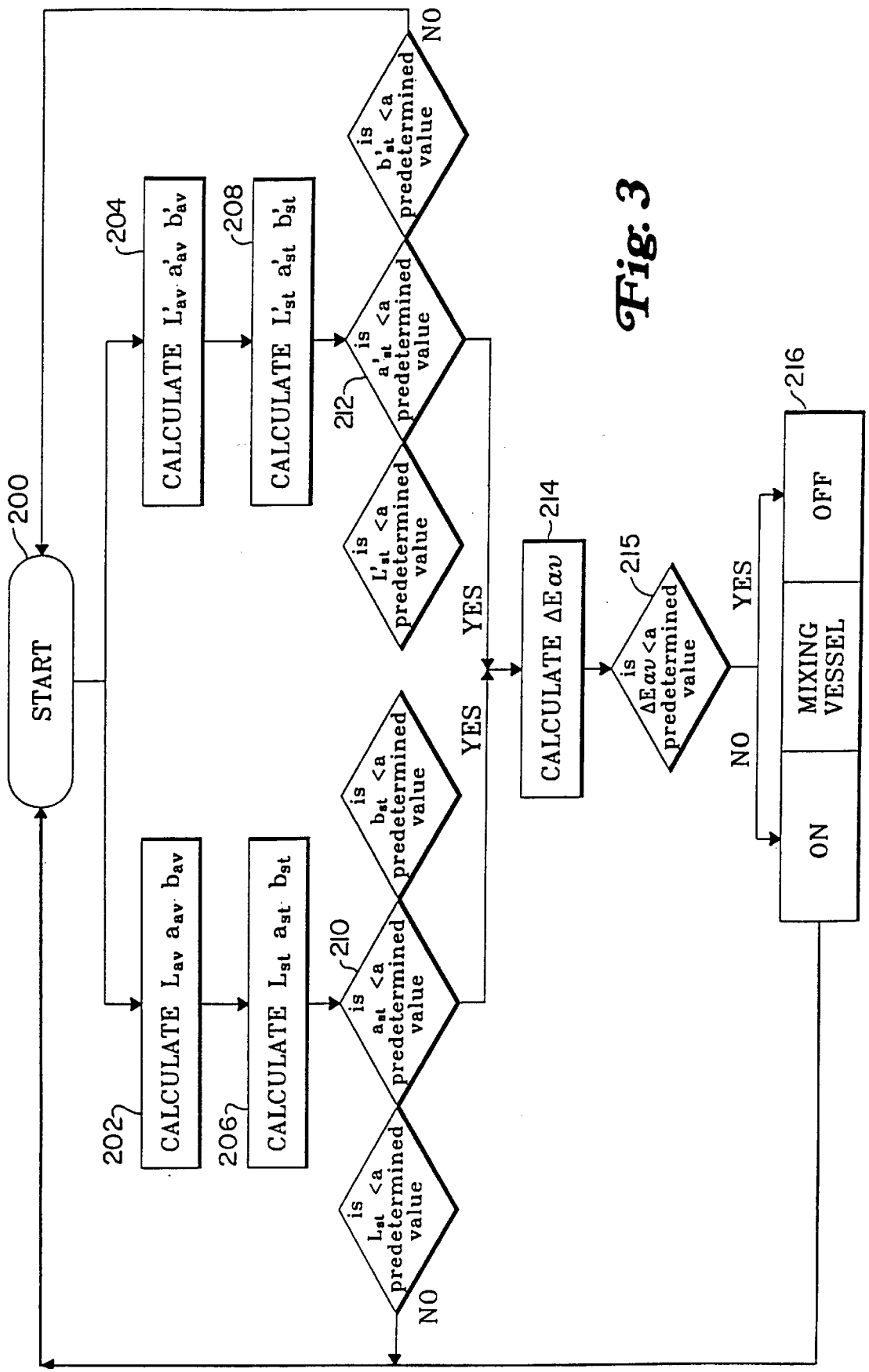
FIG. 3 is an exemplary control logic flowchart in accordance with one embodiment of the instant invention.

An exemplary control logic sequence for online apparatus 110 is shown in FIG. 3. The online blend monitoring by apparatus 110 is started at block 200.

At blocks 202 and 204, the average tri-color signal values ($L_{av}$; $a_{av}$; $b_{av}$; $L'_{av}$; $a'_{av}$ and $b'_{av}$) are determined for each of the respective probe locations. At blocks 206 and 208 the standard deviation tri-color signal values ($L_{st}$; $a_{st}$; $b_{st}$; $L'_{st}$; $a'_{st}$ and $b'_{st}$) are determined for each of the respective probe locations.

Next, at blocks 210 and 212, a determination is made of whether the blend is locally homogeneous, in the manner described above, for both probe locations. If the values indicate the blend is not locally homogeneous at either or both probe locations, the process returns to block 200 and starts over. If the values indicate the blend is locally homogeneous at both probe locations, the process continues to block 214. At block 214, the average color difference (ΔEav) is calculated.

Next, at block 215, a determination is made of whether the blend is globally homogeneous, in the manner described above. If the values indicate the blend is not globally homogeneous, the process returns to block 200 and starts over. If the mixing vessel is in an off position when it is determined that the blend is not globally homogeneous, an intervening step at block 216 may include turning mixing vessel on before returning to block 200.

If the values indicate the blend is globally homogeneous, the process advances to block 216 and the mixing vessel is turned off as the constituents of the blend are adequately inter-mixed.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for sensing color blend homogeneity of at least a first and a second material blend portion, said apparatus comprising:
   a light transmission plate for holding said material blend portions;
   a light source for emitting a light beam;
   a color sensor;
   an illumination assembly having a first end optically coupled to said light source and a second end optically coupled to and disposed normal to said light transmissive plate so as to illuminate said first and second material blend portions disposed on said light transmission plate with said light beam;
   at least one detection assembly having a first end disposed adjacent said light transmissive plate so as to detect the diffuse reflection from said illumination of said first and second material blend portions and a second end optically coupled to said color sensor; and
   wherein said color sensor senses the diffuse reflecting light from said first and second material blends and transforms said diffuse reflecting light into tri-color signals so as to determine the local and global homogeneity of said first and second material blend portions.

2. An apparatus for sensing color blend homogeneity, in accordance with claim 1, wherein said light transmissive plate is optically transparent.

3. An apparatus for sensing color blend homogeneity, in accordance with claim 1, wherein said light transmissive plate comprises a quartz material.

4. An apparatus for sensing color blend homogeneity, in accordance with claim 1, wherein said light transmissive plate further comprises a multi-axis positioner.

5. An apparatus for sensing color blend homogeneity, in accordance with claim 1, wherein said light source comprises any light source capable of providing a good spectrum through the visible light region.

6. An apparatus for sensing color blend homogeneity, in accordance with claim 1, wherein said light source emits a light beam at a wavelength in the range between about 400 nm to about 770 nm.

7. An apparatus for sensing color blend homogeneity, in accordance with claim 1, wherein said light source comprises a tungsten-halogen light source.

8. An apparatus for sensing color blend homogeneity, in accordance with claim 1, wherein said color sensor is selected from the group consisting of a spectrometer, a spectrophotometer, a spectrocolorimeter, and a spectrophotometric calorimeter.

9. An apparatus for sensing color blend homogeneity, in accordance with claim 1, wherein said illumination assembly comprises a first lens disposed adjacent said light source, at least a bifurcated optical fiber having a light source end aligned with said first lens so as to complete an optical coupling at said light source and a second lens disposed adjacent said light transmissive plate so as to intercept said light beam injected into said optical fiber and project said light beam onto said light transmissive plate so as to illuminate said material blend portions.

10. An apparatus for sensing color blend homogeneity, in accordance with claim 1, wherein said detection assembly comprises a first detection lens disposed adjacent said light transmissive plate at angle ($\alpha$) with respect to a reference axis so as to detect diffuse reflection from said illuminated material blend portions and an optical fiber coupled to said color sensor so as to transmit said diffuse reflection from said first detection lens to said color sensor.

11. An apparatus for sensing color blend homogeneity, in accordance with claim 10, wherein said angle ($\alpha$) is in the range between about 1° to about 89°.

12. An apparatus for sensing color blend homogeneity, in accordance with claim 10, wherein said angle ($\alpha$) is in the range between about 35° to about 55°.

13. An apparatus for sensing color blend homogeneity, in accordance with claim 1, wherein said first and second material blend portions are removed from at least two locations within a polymer mixing vessel.

14. An apparatus for sensing color blend homogeneity, in accordance with claim 1, wherein said first material blend is disposed on said light transmissive plate and said color sensor collects the diffuse reflection from said first material blend portion and transforms said collected light into a first tri-color signal.

15. An apparatus for sensing color blend homogeneity, in accordance with claim 14, wherein said light transmissive plate is movable with respect to said illumination assembly such that a different portion of said first blend sample is illuminated and a second diffuse reflection of said material blend portion is detected by said detection assembly and is transmitted to said color sensor wherein said color sensor collects said light from said first material blend portion and transforms the collected light into a second tri-color signal.

16. An apparatus for sensing color blend homogeneity, in accordance with claim 15, wherein said light transmissive plate is movable with respect to said illumination assembly such that different portions of said first material blend portion is illuminated and collected light is transformed into tri-color signals at a plurality of locations of said first material blend portion.

17. An apparatus for sensing color blend homogeneity, in accordance with claim 16, wherein said plurality of locations is in the range between about 8 to 30 locations of said first blend sample portion.

18. An apparatus for sensing color blend homogeneity, in accordance with claim 16, wherein an average tri-color signal from all locations is calculated and a standard deviation of all the tri-color signals is calculated such that first sample blend portion is characterized by six values:($L_{av}$; $a_{av}$; $b_{av}$; $L_{st}$; $a_{st}$ and $b_{st}$).

19. An apparatus for sensing color blend homogeneity, in accordance with claim 18, wherein said first material blend portion is replaced on said light transmissive plate by said second blend sample portion and said second blend sample portion is also uniquely characterized by six values:($L'_{av}$; $a'_{av}$; $b'_{av}$; $L'_{st}$; $a'_{st}$ and $b'_{st}$).

20. An apparatus for sensing color blend homogeneity, in accordance with claim 19, wherein said average color difference ($\Delta Eav$) between said first material blend portion and said second material blend portion is calculated utilizing the formula $\Delta E_{av}=\sqrt{(\Delta L_{av}^2+\Delta a_{av}^2+\Delta b_{av}^2)}$, where, $\Delta L_{av}=L_{av}-L'_{av}$, $\Delta a_{av}=a_{av}-a'_{av}$, and $\Delta b_{av}=b_{av}-b'_{av}$, to find if said average color difference ($\Delta E_{av}$) is within a pre-determined range so as to characterize said blend portions as globally homogeneous.

21. An apparatus for sensing color blend homogeneity, in accordance with claim 20, wherein said blend portions are characterized as globally homogeneous when ($\Delta Eav$) is less than about 1.

22. An apparatus for sensing color blend homogeneity, in accordance with claim 19, wherein said standard deviation tri-color signal values of said first material blend portion and said second material blend portion are analyzed by said color sensor to detect if said values are less than a predetermined amount so as to characterize said blend portions as locally homogeneous.

23. An apparatus for sensing color blend homogeneity, in accordance with claim 22, wherein said predetermined amount is less than about 0.25 to about 2 L, a, b units.

24. An apparatus for sensing color blend homogeneity, in accordance with claim 23, wherein said blend is characterized as sufficiently mixed when said values indicate said material blend portions are both globally and local homogeneous.

25. An online apparatus for sensing color blend homogeneity in a material blend mixing vessel, said apparatus comprising:
   a first probe assembly comprising a light transmissive window disposed within a side wall of said mixing vessel, an illumination assembly and a detection assembly;
   a second probe assembly comprising a light transmissive window disposed within a second portion of said side wall of said mixing vessel, an illumination assembly and a detection assembly;
   a light source for emitting a light beam;
   a color sensor;
   wherein each of said illumination assemblies have a first end optically coupled to said light source and a second end optically coupled to and disposed normal to said light transmissive windows so as to illuminate portions of said material blend within said mixing vessel with said light beam;
   wherein each of said detection assemblies have a first end disposed adjacent said light transmissive windows so as to detect the diffuse reflection from said illumination of said material blend portions and a second end optically coupled to said color sensor; and
   wherein said color sensor collects the diffuse reflecting light from said first and second probe assemblies and transforms said diffuse reflecting light into tri-color signals so as to determine the local and global homogeneity of said material blend.

26. An online apparatus for sensing color blend homogeneity in a material blend mixing vessel, in accordance with claim 25, wherein said light transmissive windows are optically transparent.

27. An online apparatus for sensing color blend homogeneity in a material blend mixing vessel, in accordance with claim 25, wherein said light transmissive windows comprise a quartz material.

28. An online apparatus for sensing color blend homogeneity in a material blend mixing vessel, in accordance with claim 25, wherein said light source comprises any light source capable of providing a good spectrum through the visible region.

29. An online apparatus for sensing color blend homogeneity in a material blend mixing vessel, in accordance with claim 25, wherein said light source emits a light beam any wavelength in the range between about 400 nm to about 770 nm.

30. An online apparatus for sensing color blend homogeneity in a material blend mixing vessel, in accordance with claim 25, wherein said light source comprises a tungsten-halogen light source.

31. An online apparatus for sensing color blend homogeneity in a material blend mixing vessel, in accordance with claim 25, wherein said color sensor is selected from the group consisting of a spectrometer, a spectrophotometer, a spectrocolorimeter, and a spectrophotometric colorimeter.

32. An online apparatus for sensing color blend homogeneity in a material blend mixing vessel, in accordance with claim 25, wherein said illumination assemblies comprise a first lens disposed adjacent said light source, at least a tri-furcated optical fiber having a light source end aligned with said first lens to complete an optical coupling with said light source and at least a pair of second lenses disposed adjacent said respective light transmissive windows so as to intercept said light being injected into said optical fiber and project said light beam onto said light transmissive windows so as to illuminate said respective portions of said material blend.

33. An online apparatus for sensing color blend homogeneity in a material blend mixing vessel, in accordance with claim 25, wherein said detection assemblies comprise a first detection lens disposed adjacent said light transmissive windows at an angle ($\alpha$) with respect to a reference axis so as to detect diffuse reflection from said illuminated material blend portions and an optical fiber coupled to said color sensor so as to transmit the diffuse reflection from said detection lens to said color sensor.

34. An online apparatus for sensing color blend homogeneity in a material blend mixing vessel, in accordance with claim 33, wherein said angle is in the range between about 1° to about 89°.

35. An online apparatus for sensing color blend homogeneity in a material blend mixing vessel, in accordance with claim 33, wherein said angle is in the range between about 35° to about 55°.

36. An online apparatus for sensing color blend homogeneity in a material blend mixing vessel, in accordance with claim 25, wherein said color sensor collects the light from said sample blend within said mixing vessel from both said first probe assembly and said second probe assembly and transforms the collected light into respective tri-color signals.

37. An online apparatus for sensing color blend homogeneity in a material blend mixing vessel, in accordance with claim 36, wherein said light is collected and transformed by color sensor into tri-color signals a number of times.

38. An online apparatus for sensing color blend homogeneity in a material blend mixing vessel, in accordance with claim 37, wherein said light is collected and transformed by color sensor into tri-color signals in the range between about 8 to 30 times.

39. An online apparatus for sensing color blend homogeneity in a material blend mixing vessel, in accordance with claim 37, wherein the average tri-color signal from each probe location is calculated and the standard deviation of all the tri-color signals is calculated such that said sample blend is uniquely characterized by six values at first probe assembly location and six values at second probe assembly location.

40. An online apparatus for sensing color blend homogeneity in a material blend mixing vessel, in accordance with claim 39, wherein said average color difference ($\Delta E_{av}$) between said first probe assembly location and said second probe assembly location is calculated utilizing the formula $\Delta E_{av} = \sqrt{(\Delta L_{av}^2 + \Delta a_{av}^2 + \Delta b_{av}^2)}$, where, $\Delta L_{av} = L_{av} - L'_{av}$, $\Delta a_{av} = a_{av} - a'_{av}$, and $\Delta b_{av} = b_{av} - b'_{av}$, to find if said average color difference ($\Delta Eav$) is within a pre-determined range so as to characterize said blend portions as globally homogeneous.

41. An online apparatus for sensing color blend homogeneity in a material blend mixing vessel, in accordance with claim 40, wherein said blend portions are characterized as globally homogeneous when ($\Delta Eav$) is less than about 1.

42. An online apparatus for sensing color blend homogeneity in a material blend mixing vessel, in accordance with claim 40, wherein a standard deviation of said tri-color signal values of said first probe assembly location and said second probe assembly location are analyzed to check if said values are less than a predetermined amount so as to characterize said blend portions as locally homogeneous.

43. An online apparatus for sensing color blend homogeneity in a material blend mixing vessel, in accordance with claim 42, wherein said predetermined amount is less than about 0.25 to about 2 L, a, b units.

44. An online apparatus for sensing color blend homogeneity in a material blend mixing vessel, in accordance with claim 43, wherein said blend is characterized as sufficiently mixed when the values indicate the samples are both globally and locally homogeneous.

* * * * *